(12) United States Patent
Bounds

(10) Patent No.: US 12,325,273 B2
(45) Date of Patent: Jun. 10, 2025

(54) GAS SPRING SEAL CAPS AS WELL AS GAS SPRING AND DAMPER ASSEMBLIES AND METHODS INCLUDING SAME

(71) Applicant: Firestone Industrial Products Company, LLC, Nashville, TN (US)

(72) Inventor: Joseph A. Bounds, Hermitage, TN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 646 days.

(21) Appl. No.: 17/631,459

(22) PCT Filed: Jul. 31, 2020

(86) PCT No.: PCT/US2020/044369
§ 371 (c)(1),
(2) Date: Jan. 29, 2022

(87) PCT Pub. No.: WO2021/022102
PCT Pub. Date: Feb. 4, 2021

(65) Prior Publication Data
US 2022/0274456 A1    Sep. 1, 2022

Related U.S. Application Data

(60) Provisional application No. 62/881,102, filed on Jul. 31, 2019.

(51) Int. Cl.
*B60G 11/27* (2006.01)
*B60G 15/14* (2006.01)
(Continued)

(52) U.S. Cl.
CPC .............. *B60G 11/27* (2013.01); *B60G 15/14* (2013.01); *F16F 9/0454* (2013.01); *F16F 9/05* (2013.01);
(Continued)

(58) Field of Classification Search
CPC ...... F16F 9/05; F16F 9/36; F16F 9/084; F16F 9/0454; F16F 9/292; F16F 2230/0023;
(Continued)

(56) References Cited

U.S. PATENT DOCUMENTS 4,798,369 A * 1/1989 Geno ..................... G01S 15/88
73/632
4,817,922 A * 4/1989 Hovance .............. B60G 17/052
280/5.514
(Continued)

FOREIGN PATENT DOCUMENTS

CN    1117658 A    2/1996
CN    1120749 A    4/1996
(Continued)

OTHER PUBLICATIONS

International Search Report and Written Opinion dated Nov. 11, 2020 issued by EPO in connection with corresponding International Application No. PCT/US2020/044369.
(Continued)

*Primary Examiner* — Robert A. Siconolfi
*Assistant Examiner* — San M Aung

(57) ABSTRACT

A gas spring seal cap secured a first end member of a gas spring and damper assembly such that a substantially fluid-tight connection is formed therebetween. Seal cap includes a seal cap body with a first end surface portion and a second end surface portion. An electrical conductor extends through seal cap body that includes a first terminal end conductively accessible from along the first end surface portion and a second terminal end that is conductively accessible from along the second end surface portion of seal cap body. Electrical conductor includes a substantially impermeable portion having a substantially fluid-tight connection with seal cap body. The substantially impermeable portion of electrical conductor substantially inhibits fluid communica-
(Continued)

tion across seal cap body through electrical conductor. Gas spring and damper assemblies as well as methods of assembly are also included.

20 Claims, 10 Drawing Sheets

(51) Int. Cl.
  *F16F 9/04* (2006.01)
  *F16F 9/05* (2006.01)
(52) U.S. Cl.
  CPC .. *B60G 2202/152* (2013.01); *B60G 2202/314* (2013.01); *B60G 2204/112* (2013.01)
(58) Field of Classification Search
  CPC ...... B60G 11/27; B60G 15/14; B60G 17/019; B60G 2202/152; B60G 2202/314; B60G 2204/111; B60G 2204/112
  USPC ...................................................... 267/64.27
  See application file for complete search history.

(56) References Cited

U.S. PATENT DOCUMENTS

| | | | |
|---|---|---|---|
| 4,988,082 A * | 1/1991 | Pees | F16F 9/084 |
| | | | 267/64.27 |
| 5,493,073 A | 2/1996 | Honkomp | |
| 5,584,716 A | 12/1996 | Bergman | |
| 7,745,725 B2 | 6/2010 | Paterek et al. | |
| 8,668,188 B2 | 3/2014 | Gnateski | |
| 2007/0052141 A1 | 3/2007 | Li | |
| 2016/0272028 A1* | 9/2016 | DeBruler | F16F 9/049 |

FOREIGN PATENT DOCUMENTS

| | | | | |
|---|---|---|---|---|
| CN | 201210543 Y | 3/2009 | | |
| CN | 102384198 A | 3/2012 | | |
| CN | 105417316 A | 3/2016 | | |
| CN | 109083965 A | 12/2018 | | |
| DE | 102006017275 B4 * | 1/2011 | ....... | B60G 17/01933 |
| DE | 102011001495 A1 | 9/2012 | | |
| EP | 0313501 A2 | 4/1989 | | |
| EP | 2735760 A1 | 5/2014 | | |
| EP | 3683071 A1 * | 7/2020 | ............. | B60G 11/27 |
| WO | WO-2021022102 A1 * | 2/2021 | ............. | B60G 11/27 |

OTHER PUBLICATIONS

Chinese-language Office Action issued on Feb. 9, 2023 by the Chinese National Intellectual Property Administration in connection with corresponding Chinese Patent Application No. CN 202080053464.2 as well as English-language machine translation of the Office Action.

* cited by examiner

GAS SPRING SEAL CAPS AS WELL AS GAS SPRING AND DAMPER ASSEMBLIES AND METHODS INCLUDING SAME This application is the National Stage of International Application No. PCT/US2020/044369, filed on Jul. 31, 2020, which claims the benefit of priority from U.S. Provisional Patent Application No. 62/881,102, filed on Jul. 31, 2019, the subject matter of which is hereby incorporated herein by reference in its entirety.

BACKGROUND

The subject matter of the present disclosure broadly relates to the art of gas spring devices and, more particularly, to seal caps with an integrated electrical conductor. Such seal caps are dimensioned for securement to an end member of a gas spring or gas spring and damper assembly. Gas spring and damper assemblies including one or more of such seal caps as well as suspension systems including one or more of such gas spring and damper assemblies are also included.

The subject matter of the present disclosure may find particular application and use in conjunction with components for wheeled vehicles and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Generally, the plurality of spring devices function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In some cases, the spring devices of vehicle suspension systems can be of a type and kind that are commonly referred to in the art as gas spring assemblies, which are understood to utilize pressurized gas as the working medium thereof. Typically, such gas spring assemblies include a flexible spring member that is operatively connected between comparatively rigid end members to form a spring chamber. Pressurized gas can be transferred into and/or out of the spring chamber to alter the height of the gas spring assembly, the position of the sprung and unsprung masses relative to one another and/or to provide other performance-related characteristics. Vehicle suspension systems also commonly include one or more dampers or damping components that are operative to dissipate energy associated with undesired inputs and movements of the sprung mass, such as road inputs occurring under dynamic operation of a vehicle, for example. Such dampers often contain a quantity of damping liquid and are typically operatively connected between a sprung mass and an unsprung mass, such as between a body and axle of a vehicle, for example. In some cases, the gas spring and damper can be operatively connected with one another to form a gas spring and damper assembly with a portion of the damper extending through the spring chamber of the gas spring.

Additionally, a variety of sensor arrangements, control devices and/or other electronic components are commonly used to assist in monitoring and/or altering the performance and/or operation of the suspension components, such as one or more spring devices, damping devices and/or any combination thereof. As non-limiting examples, such sensors can include any number of zero or more height sensors, acceleration sensors, gyroscopic sensors, pressure sensors, and/or temperature sensors. Additionally, or in the alternative, non-limiting examples of such control devices can include valves operable to transfer pressurized gas into and/or out of one or more gas spring devices and/or chambers thereof and/or values operable to alter performance characteristics of one or more damping devices. In many cases, electrical power and communications are transferred into and/or out of such one or more sensor arrangements, control devices and/or other electrical components by way of wires and/or other conductors, and a variety of constructions have been developed to allow such wires and/or other conductors to pass into and out of the spring chamber while maintaining a substantially fluid-tight connection with the gas spring.

Notwithstanding the overall success of known constructions, certain disadvantages may still exist that could be limiting to broader adoption and/or use of gas spring and damper assemblies with internal sensors, control devices and/or other electronic components. Accordingly, it is believed desirable to develop constructions that overcome the foregoing and/or other problems and/or disadvantages of known designs, and/or otherwise advance the art of gas spring and damper assemblies.

BRIEF DESCRIPTION

One example of a seal cap in accordance with the subject matter of the present disclosure can be dimensioned for securement to an associated end member of an associated gas spring and damper assembly. The seal cap can include a seal cap body having a longitudinal axis and extending outward from along the longitudinal axis toward an outer periphery dimensioned to cooperatively engage the associated end member. The seal cap body can include a first surface portion disposed along a first side of the seal cap and a second surface portion disposed along a second side of the seal cap and facing opposite the first surface portion. The seal cap body can also include an outer peripheral surface portion that can at least partially define the outer periphery of the seal cap. An electrical conductor can be at least partially embedded within the seal cap body such that a substantially fluid tight seal is formed along at least a portion of the electrical conductor while remaining conductively accessible along the first side, the second side or the first and second sides of the seal cap.

In some cases, a seal cap according to the foregoing paragraph can have an electrical conductor that includes an embedded conductor portion that is at least partially embedded within the seal cap body and an outer conductor portion conductively coupled with the embedded conductor portion. The outer conductor portion can project outwardly beyond one of the first surface portion, the second surface portion and the outer peripheral surface portion.

In some cases, a seal cap according to the foregoing paragraph can include an electrical conductor for which the outer conductor portion is a first outer conductor portion projecting outward beyond one of the first surface portion and the outer peripheral surface portion. And, the electrical conductor can include a second conductor portion projecting outward beyond one of the second surface portion and the outer peripheral surface portion.

In some cases, a seal cap according to any one of foregoing three paragraphs can include a portion of the solid electrical conductor extending longitudinally beyond the first end surface portion in the direction opposite the second end surface portion with the portion of the electrical conductor being adapted for insertion into an associated electrical connector.

Another example of a gas spring seal cap in accordance with the subject matter of the present disclosure can be dimensioned for securement to an associated end member. The gas spring seal cap can include a seal cap body having a longitudinal axis and extending radially outward from along the longitudinal axis. The seal cap body can include a first end surface portion disposed along a first side of the gas spring seal cap and a second end surface portion disposed along a second side of the gas spring seal cap that is spaced longitudinally from the first side and facing opposite the first end surface portion with an outer peripheral surface portion disposed between the first and second end surface portions. The gas spring seal cap can also include a first electrical conductor and a second electrical conductor that each extend through the seal cap body with each of the first and second electrical conductors disposed radially inward from the outer peripheral surface of the seal cap body. The first and second electrical conductors can include a first terminal end conductively accessible from along the first end surface portion of the seal cap body and a second terminal end conductively accessible from along the second end surface portion of the seal cap body. The first and second terminal ends can be adapted for conductive coupling with associated electrical connectors. Each of the first and second electrical conductors can include a substantially impermeable portion having a substantially fluid-tight connection with the seal cap body. The substantially impermeable portion of each of the first and second electrical conductors can substantially inhibit fluid communication across the seal cap body through a respective one of the first and second electrical conductors.

An example of a gas spring and damper assembly in accordance with the subject matter of the present disclosure can include a damper that can include a damper housing and a damper rod operatively connected with the damper housing for relative reciprocal motion therebetween. A gas spring having a longitudinal axis can include a first end member supported on the damper rod and a second end member longitudinally spaced from the first end member with the second end member extending longitudinally along at least a portion of the damper housing. A flexible spring member can extend peripherally about the longitudinal axis between opposing first and second ends. The first end can be secured on the first end member such that a substantially fluid-tight seal is formed therebetween and the second end can be secured on the second end member such that a substantially fluid-tight seal is formed therebetween. The flexible spring member and the first and second end members can at least partially define a spring chamber. An internal conductor can be at least partially disposed within at least one of the gas spring chamber, the damper housing and the damper rod. A seal cap can be secured to the first end member such that a substantially fluid-tight connection is formed therebetween. The seal cap can include a seal cap body having a longitudinal axis and can extend radially outward from along the longitudinal axis. The seal cap body can include a first end surface portion that is disposed along a first side of the gas spring seal cap and a second end surface portion that is disposed along a second side of the gas spring seal cap. The second side of the gas spring seal cap is spaced longitudinally from the first side and the second end surface portion faces opposite the first end surface portion. An outer peripheral surface portion can be disposed between the first and second end surface portions. An electrical conductor can extend through the seal cap body. The electrical conductor can be disposed radially inward from the outer peripheral surface and can include a first terminal end conductively accessible from along the first end surface portion of the seal cap body. The electrical conductor can also include a second terminal end that is conductively accessible from along the second end surface portion of the seal cap body with the second terminal end conductively connected to the internal conductor. The electrical conductor can include a substantially impermeable portion having a substantially fluid-tight connection with the seal cap body. The substantially impermeable portion of the electrical conductor substantially inhibiting fluid communication across the seal cap body through the electrical conductor.

One example of a method of assembling a gas spring and damper assembly in accordance with the subject matter of the present disclosure can include securing a flexible spring member to a first end member to at least partially define a spring chamber. The method can also include providing a damper including a damper housing and a damper rod operatively connected to one another such that the damper rod and damper housing can undergo relative reciprocal motion. The method can further include securing a gas spring end member to the damper rod of the damper such that the damper rod extends through the spring chamber. The method can also include extending an internal conductor through at least a portion of at least one of the gas spring chamber, the damper housing and the damper rod. The method can also include providing a gas spring seal cap according to any one of the foregoing paragraphs and conductively coupling the internal conductor to the second terminal end of at least one of the first and second electrical conductors of the gas spring seal cap. The method can further include securing the seal cap on the first end member such that a substantially fluid tight seal is formed between the seal cap and the first end member with the internal conductor conductively coupled with the first terminal end of the at least one of the first and second electrical conductors of the gas spring seal cap.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
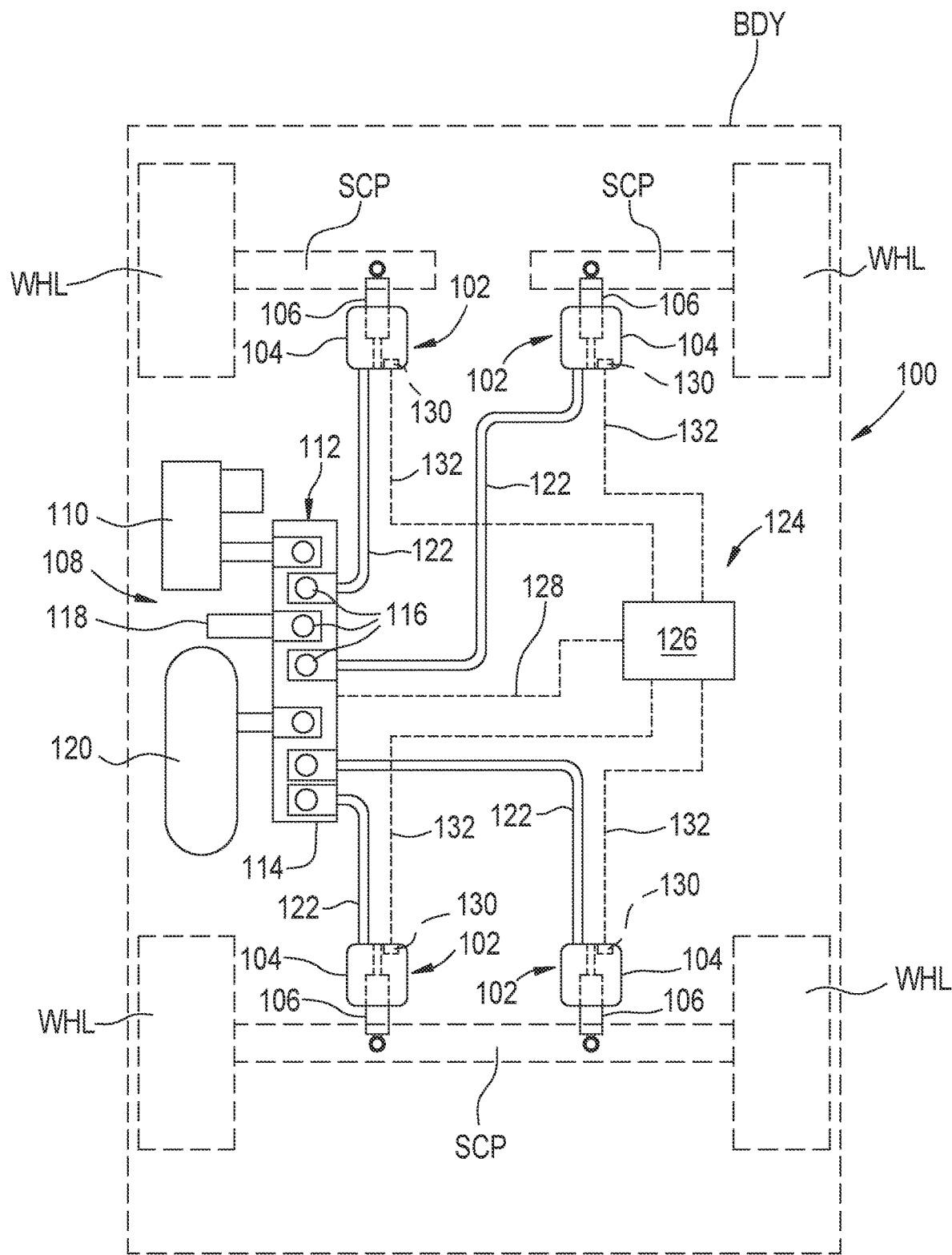
FIG. 1 is a schematic representation of one example of a suspension system of an associated vehicle that includes one or more gas spring and damper assemblies in accordance with the subject matter of the present disclosure.

FIG. 1 illustrates one example of a suspension system 100 operatively disposed between a sprung mass, such as an associated vehicle body BDY, for example, and an unsprung mass, such as an associated wheel WHL or an associated suspension component SCP, for example, of an associated vehicle VHC. It will be appreciated that any one or more of the components of the suspension system can be operatively connected between the sprung and unsprung masses of the associated vehicle in any suitable manner.

For example, in the arrangement shown, suspension system 100 can include a plurality of gas spring and damper assemblies 102 that are operatively connected between the sprung and unsprung masses of the vehicle. Depending on desired performance characteristics and/or other factors, the suspension system can include any suitable number of gas spring and damper assemblies. For example, in the arrangement shown in FIG. 1, suspension system 100 includes four gas spring and damper assemblies 102, one of which is disposed toward each corner of the associated vehicle adjacent a corresponding wheel WHL. It will be appreciated, however, that any other suitable number of gas spring and damper assemblies could alternately be used in any other configuration and/or arrangement. As shown in FIG. 1, gas spring and damper assemblies 102 are supported between suspension components SCP and body BDY of associated vehicle VHC. Gas spring and damper assemblies 102 can include a gas spring (or gas spring assembly) 104 and a damper (or damper assembly) 106 as well as a seal cap (not shown in FIG. 1) in accordance with the subject matter of the present disclosure. It will be recognized that gas springs 104 are shown and described herein as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring and damper assemblies for selectively supplying pressurized gas (e.g., air) thereto and selectively transferring pressurized gas therefrom. As shown in the exemplary embodiment in FIG. 1, pressurized gas system 108 can include a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas.

Valve assembly 112 is in communication with gas springs 104 and/or dampers 106 of assemblies 102 through suitable gas transfer lines 122. As such, pressurized gas can be selectively transferred into and/or out of the gas springs and/or the dampers through valve assembly 112 by selectively operating valves 116, such as to alter or maintain vehicle height at one or more corners of the vehicle, for example.

Suspension system 100 can also include a control system 124 that is capable of communication with any one or more systems and/or components of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

One or more sensing devices, control devices and/or other electronic devices, which are collectively represented in FIG. 1 by boxes 130, may be operatively associated with the gas spring and damper assemblies. As non-limiting examples, devices 130 can be capable of outputting or otherwise generating data, signals and/or other communications having a relation to—as non-limiting examples—one or more of: environmental, performance and/or operating conditions associated with suspension system 100 and/or any components and/or systems thereof; a height of the gas spring and damper assemblies; a distance between other components of the vehicle, a pressure or temperature having a relation to the gas spring and damper assembly and/or a wheel or tire or other component associated with the gas spring and damper assembly; and/or an acceleration, load or other input acting on the gas spring and damper assembly. As additional non-limiting examples, devices 130 can include control devices, such as electrically-actuatable valves, for example, that are operable to control fluid flow into, out of and/or within gas springs 104 and/or dampers 106. Devices 130 can be communicatively coupled with one or more components and/or systems of control system 124, such as ECU 126, for example, and can send, receive or otherwise exchange data, signals and/or other communications therebetween. The sensing devices can be in communication with ECU 126 in any suitable manner, such as through conductors or leads 132, for example. Additionally, it will be appreciated that the sensing devices can be of any suitable type, kind and/or construction and can operate using any suitable combination of one or more operating principles and/or techniques.

Figure 4:
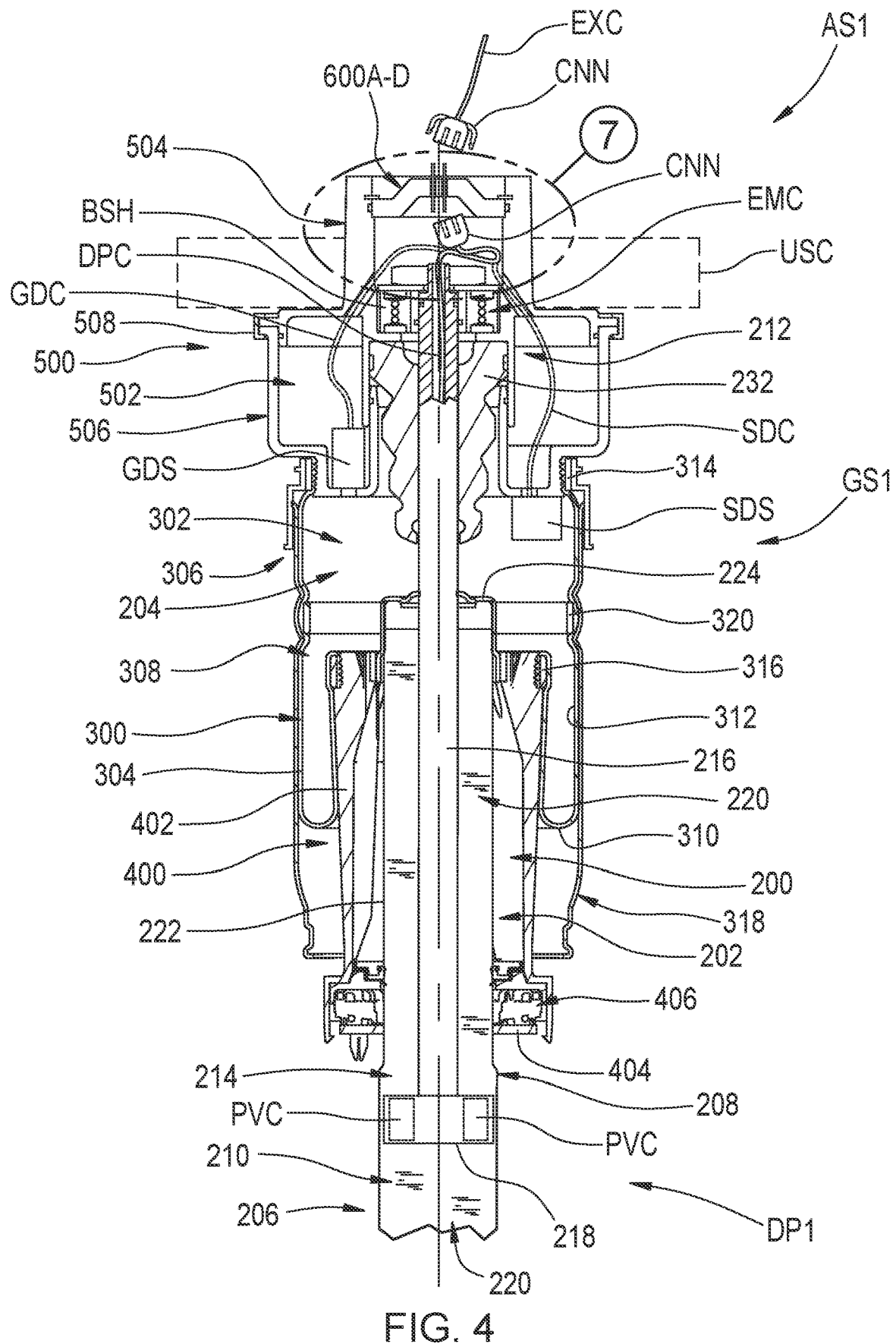
FIG. 4 is a cross-sectional side view of the exemplary gas spring and damper assembly in FIGS. 2 and 3 taken from along line 4-4 in FIG. 3.
Figure 5:
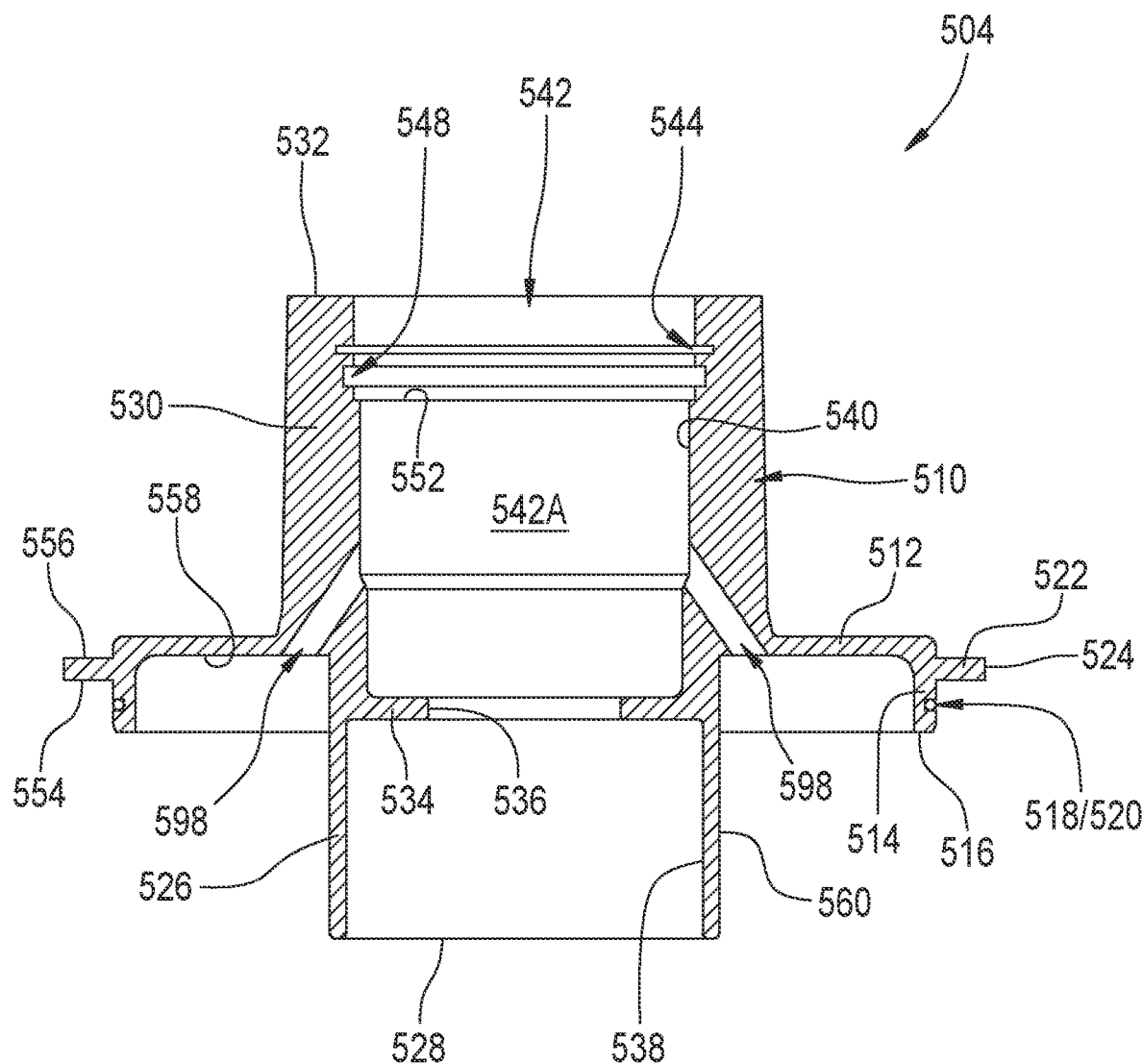
FIG. 5 is a cross-sectional side view of one exemplary end member component of the gas spring and damper assembly shown in FIGS. 2-4.
Figure 6:
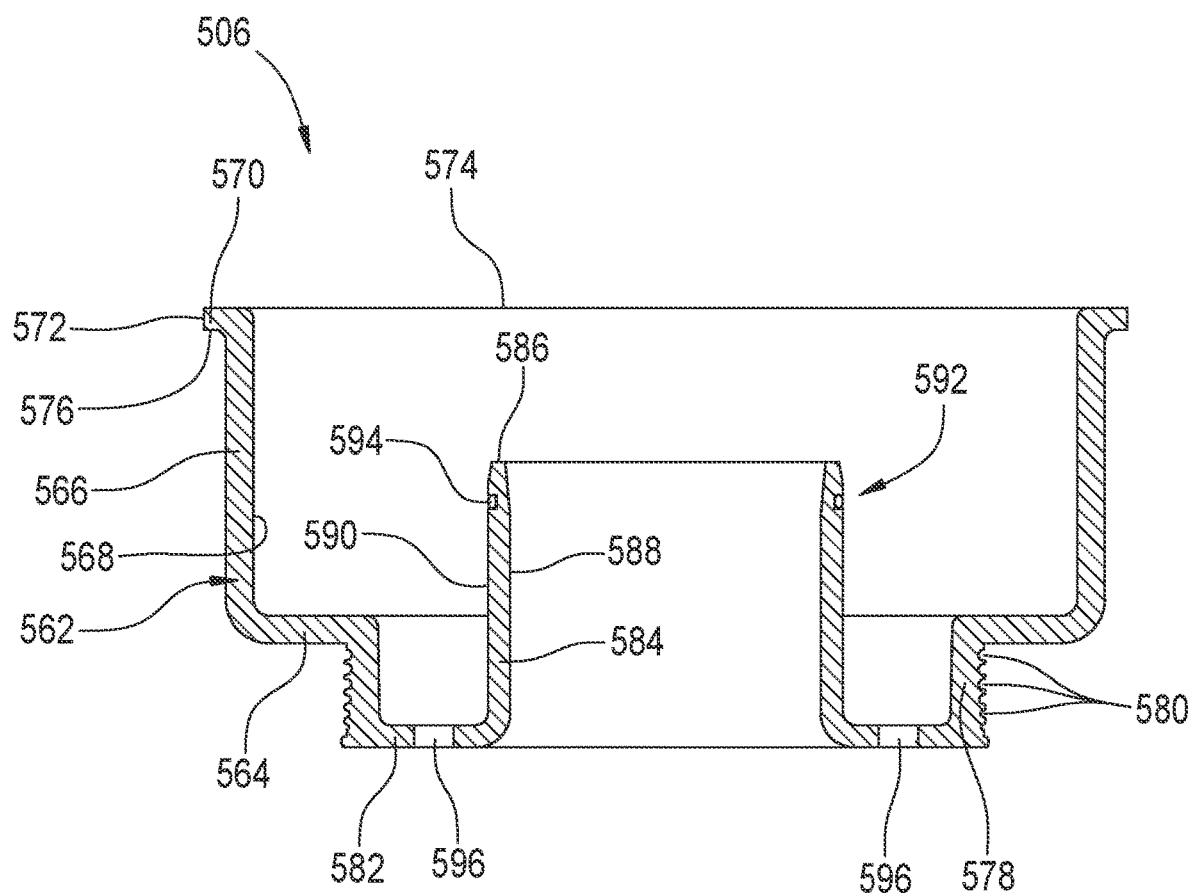
FIG. 6 is a cross-sectional side view of another exemplary end member component of the gas spring and damper assembly shown in FIGS. 2-4.

Having described an example of a suspension system (e.g., suspension system 100) that can include gas spring and damper assemblies in accordance with the subject matter of the present disclosure, one example of such a gas spring and damper assembly will now be described in connection with FIGS. 2-10. As shown therein, a gas spring and damper assembly AS1, such as may be suitable for use as one or more of gas spring and damper assemblies 102 in FIG. 1, for example, is shown as including a gas spring (or gas spring assembly) GS1, such as may correspond to one of gas springs 104 in FIG. 1, for example, and a damper (or damper assembly) DP1 such as may correspond to one of dampers 106 in FIG. 1, for example. Gas spring assembly GS1 and damper assembly DP1 can be disposed in an axially coextensive arrangement with one another, and can be operatively secured to one another in any suitable manner, such as is described hereinafter, for example. A longitudinal axis AX extends lengthwise along assembly AS1, as shown in FIG. 4. Gas spring assembly GS1 can include a flexible spring member 300, an end member (or end member assembly) 400 and an end member (or end member assembly) 500, as described in greater detail hereinafter.

Damper assembly DP1 can include a damper housing 200 and a damper rod assembly 202 that is at least partially received in the damper housing. Damper housing 200 extends axially between housing ends 204 and 206, and includes a housing wall 208 that at least partially defines a damping chamber 210. Damper rod assembly 202 extends lengthwise between opposing ends 212 and 214 and includes an elongated damper rod 216 and a damper piston 218 disposed along end 214 of damper rod assembly 202. Damper piston 218 is received within damping chamber 210 of damper housing 200 for reciprocal movement along the housing wall in a conventional manner. A quantity of damping fluid 220 can be disposed within damping chamber 210, and damper piston 218 can be displaced through the damping fluid to dissipate kinetic energy acting on gas spring and damper assembly AS1. Though damper assembly DP1 is shown and described herein as having a conventional construction in which a hydraulic fluid is contained within at least a portion of damping chamber 210, it will be recognized and appreciated that dampers of other types, kinds and/or constructions, such as pressurized gas or "air" dampers, for example, could be used without departing from the subject matter of the present disclosure.

That is, it will be appreciated that a gas spring and damper assembly in accordance with the subject matter of the present disclosure can, in some cases, include a damper of an otherwise conventional construction that utilizes hydraulic oil or other liquid as a working medium of the damper. In other cases, the damper can be of a type and kind that utilizes pressurized gas as a working medium. In such cases, such a gas damper can include one or more elongated gas damping passages through which pressurized gas can flow to generate pressurized gas damping to dissipate kinetic energy acting on the gas spring and damper assembly. It will be appreciated that such one or more elongated gas damping passages can be of any suitable size, shape, configuration and/or arrangement. Additionally, it will be appreciated that any number of one or more features and/or components can be used, either alone or in combination with one another, to form or otherwise establish such one or more elongated gas damping passages.

Housing wall 208 can include a side wall portion 222 that extends peripherally about longitudinal axis AX and can form an opening (not numbered) along housing end 204. Housing wall 208 can also include a damper end wall 224 that can extend across the opening, and can include a passage (not numbered) through which elongated damper rod 216 can extend axially outward from damping chamber 210 in a direction opposite housing end 206. Additionally, a damper end wall (not numbered) can be connected across end 206 of damper housing 200 such that a substantially fluid-tight connection is formed therebetween.

Elongated damper rod 216 can project outwardly from damper end wall 224 such that end 212 of the damper rod assembly is outwardly exposed from the damper housing and is externally accessible with respect to the damper housing. A connection feature 226, such as a plurality of threads, for example, can be provided on or along the elongated rod for use in operatively connecting gas spring and damper assembly 200 to an associated vehicle structure, a component of gas spring assembly GS1 or another component of gas spring and damper assembly 200. In some cases, a securement device 228, such as a threaded fastener, for example, can be operatively engaged with connection feature 226 to secure elongated damper rod on or along end member assembly 500.

It will be appreciated that gas spring and damper assembly AS1 can be operatively connected between associated sprung and unsprung masses of an associated vehicle (or other construction) in any suitable manner. For example, one end of the assembly can be operatively connected to an associated sprung mass with the other end of the assembly disposed toward and operatively connected to an associated unsprung mass. As shown in FIG. 4, for example, end 212 of damper rod assembly 202 can be operatively engaged (either directly or indirectly) with a first or upper structural component USC, such as associated vehicle body BDY in FIG. 1, for example, and can be secured thereon in any suitable manner. Additionally, or in the alternative, damper assembly DP1 can include a mounting bracket 230 disposed along end 206 of damper housing 200, which can be secured on or along a second or lower structural component LSC (FIG. 2), such as associated axle AXL in FIG. 1, for example, and can be secured thereon in any suitable manner.

As discussed above, gas spring assembly GS1 can include flexible spring member 300 that can extend peripherally around axis AX and can be secured between opposing end members (or end member assemblies) 400 and 500 in a substantially fluid-tight manner such that a spring chamber 302 is at least partially defined therebetween. End member 400 can be secured on or along damper housing 200 in a suitable manner. End member 400 can include an end member wall 402 that can include any suitable number of one or more walls and/or wall portions. A support ring 404 can be secured on or along the exterior of damper housing 200. A rotational support and sealing assembly 406 can be operatively disposed between end member 400 and support ring 404. For example, assembly 406 can form a substantially fluid-tight connection between damper housing 200 and end member 400 that also permits rotational movement of the end member relative to the damper housing. In a preferred arrangement, end member 400 is supported on or along damper housing 200 such that forces and loads acting on one of upper and lower structural components USC and LSC can be transmitted or otherwise communicated to the other of upper and lower structural components USC and LSC at least partially through gas spring and damper assembly AS1.

Figure 2:
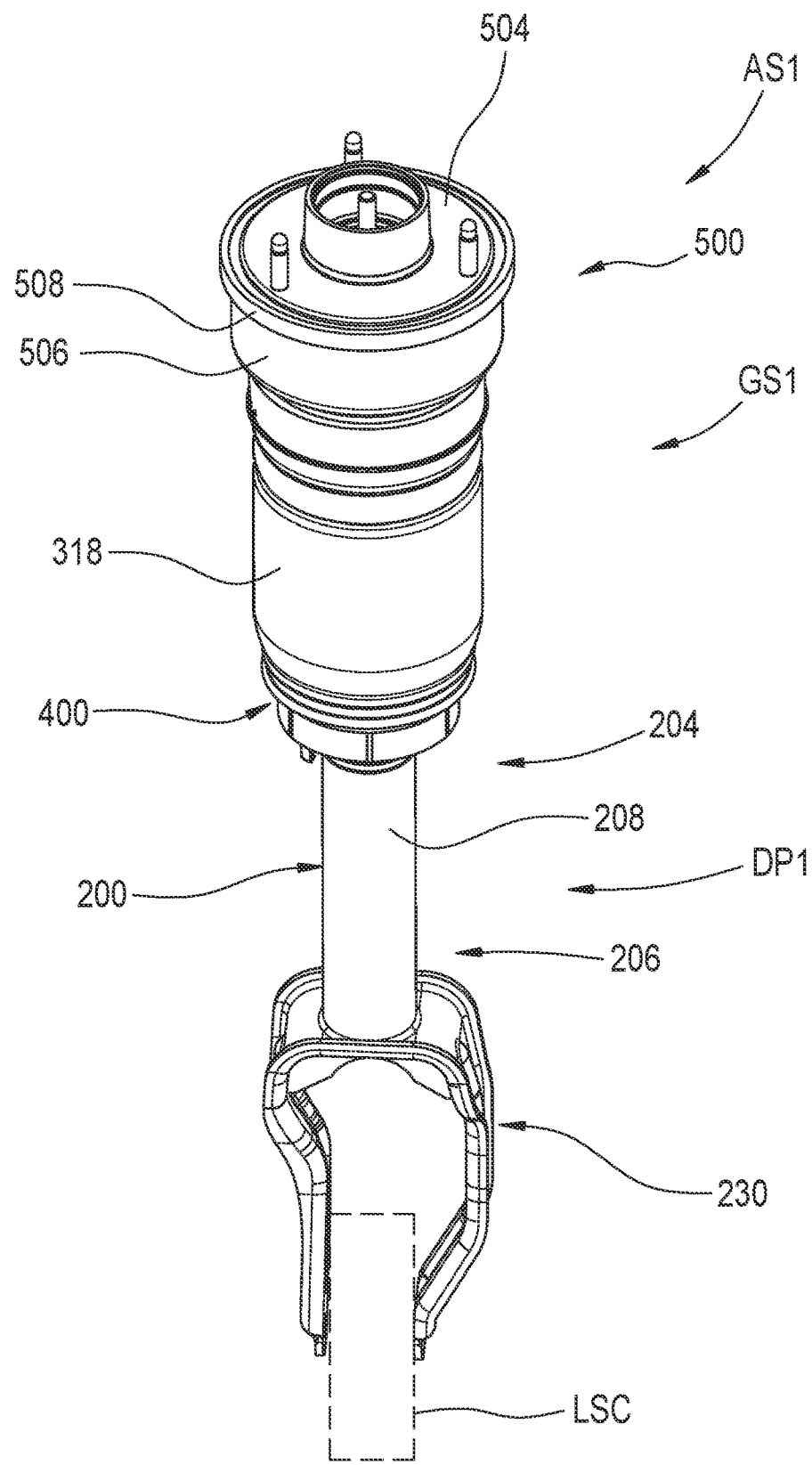
FIG. 2 is a top perspective view of one example of a gas spring and damper assembly in accordance with the subject matter of the present disclosure.
Figure 3:
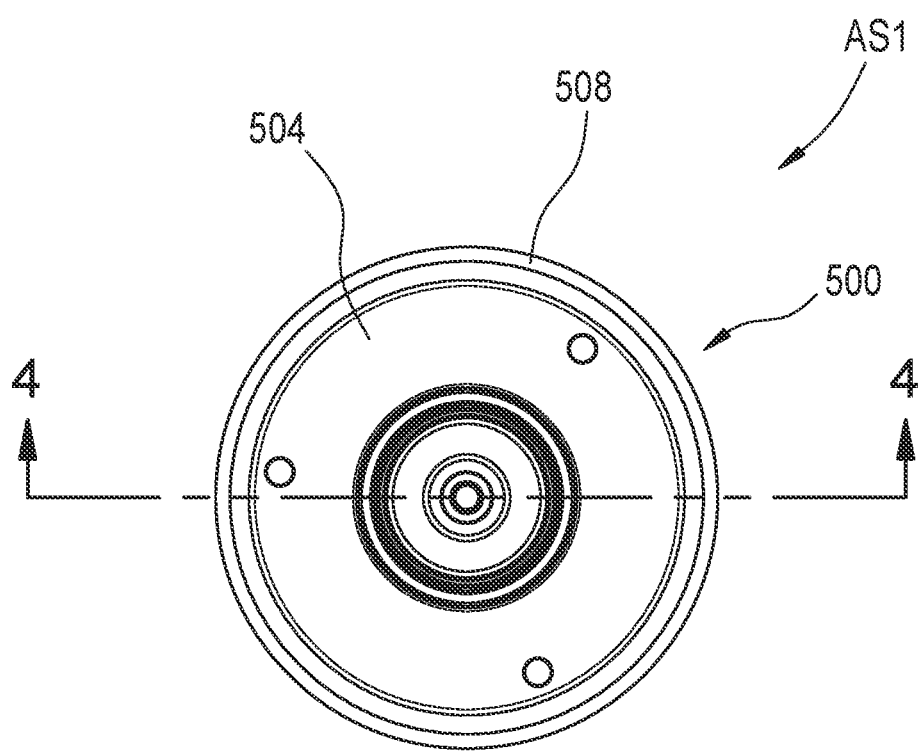
FIG. 3 is a top plan view of the exemplary gas spring and damper assembly in FIG. 2.

It will be appreciated that flexible spring member 300 can be of any suitable size, shape, construction and/or configuration. Additionally, the flexible spring member can be of any type and/or kind, such as a rolling lobe-type or convoluted bellows-type construction, for example. Flexible spring member 300 is shown in FIGS. 2 and 4 as including a flexible wall 304 that can be formed in any suitable manner and from any suitable material or combination of materials. For example, the flexible wall can include one or more fabric-reinforced, elastomeric plies or layers and/or one or more unreinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 304 can extend in a generally longitudinal direction between opposing ends 306 and 308. Additionally, flexible wall 304 can include an outer surface 310 and an inner surface 312. The inner surface can at least partially define spring chamber 302 of gas spring assembly GS1. Flexible wall 304 can include an outer or cover ply (not identified) that at least partially forms outer surface 310. Flexible wall 304 can also include an inner or liner ply (not identified) that at least partially forms inner surface 312. In some cases, flexible wall 304 can further include one or more reinforcing plies (not shown) disposed between outer and inner surfaces 310 and 312. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 300 can include any feature or combination of features suitable for forming a substantially fluid-tight connection with end member 400 and/or end member 500. As one example, flexible spring member 300 can include open ends that are secured on or along the corresponding end members by way of one or more crimp rings 314 and 316. Alternately, a mounting bead (not shown) can be disposed along either or both of the ends of the flexible wall. In some cases, the mounting bead, if provided, can, optionally, include a reinforcing element, such as an endless, annular bead wire, for example. In some cases, a restraining cylinder 318 and/or other components can be disposed radially outward along flexible wall 304. In some cases, such components can be secured on or along the flexible wall in a suitable manner, such as by way or one or more backing rings 320, for example.

As mentioned above, gas spring and damper assembly AS1 can be disposed between associated sprung and unsprung masses of an associated vehicle in any suitable manner. For example, one component can be operatively connected to the associated sprung mass with another component disposed toward and operatively connected to the associated unsprung mass. As illustrated in FIG. 2, for example, end member assembly 500 can be operatively disposed along upper structural component USC, such as associated vehicle body BDY in FIG. 1, for example, and can be secured thereon in any suitable manner.

Additionally, it will be appreciated that the end members can be of any suitable type, kind, construction and/or configuration, and can be operatively connected or otherwise secured to the flexible spring member in any suitable manner. In some cases, the end member can of a type or kind that is formed from one or more walls and/or wall portions. As a non-limiting example, end member (or end member assembly) 500 can be of a type commonly referred to as a reservoir housing and can include a plurality of walls and/or wall portions that at least partially define an end member chamber 502. In the arrangement shown in FIGS. 2-4, end member assembly 500 is shown as including an end member housing (or housing section) 504 and an end member housing (or housing section) 506 that are secured together to at least partially define end member assembly 500. It will be appreciated that housing section 504 and housing section 506 can together at least partially define end member chamber 502. It will be appreciated that housing sections 504 and 506 can be secured together in any suitable manner, such as by way of one or more threaded fasteners and/or by one or more flowed-material joints. In a preferred arrangement, end member housing 504 can be at least partially formed from a first material, such as a metal material, for example, and end member housing 506 can be formed from a second material, such as a polymeric material, that is different than the first material. In such cases, housing sections 504 and 506 can, for example, be secured in abutting engagement with one another by way of a crimp ring 508 that extends peripherally about the housing sections and retains the housing sections in a substantially fixed axial position relative to one another.

It will be appreciated that gas spring and damper assembly AS1 is displaceable, during use in normal operation, between extended and compressed conditions. In some cases, one or more jounce bumpers can be included to inhibit contact between one or more features and/or components of assembly AS1. For example, a jounce bumper 232 can be included on or along elongated damper rod 216 within spring chamber 302 adjacent end member assembly 500 to substantially inhibit contact between a component of damper assembly DP1 and end member assembly 500 during a full jounce condition of assembly AS1. It will be appreciated, however, that other configurations and/or arrangements could alternately be used.

End member housing 504 can include any suitable number of walls and/or wall portions. For example, end member housing 504 is shown in FIGS. 4-5 and 7-9 as including a housing wall 510 with an outer end wall portion 512 that is oriented transverse to longitudinal axis AX and extends radially outward to an outer side wall portion 514 that extends axially from along outer end wall portion 512 toward a distal edge 516. In some cases, an annular groove 518 or other similar features can be disposed along outer side wall portion 514, such as may be suitable for sealingly receiving a sealing element 520. An outer peripheral wall portion 522 extends radially outward from along outer side wall portion 514 to an outer peripheral edge 524. An inner side wall portion 526 extends axially from along outer end wall portion 512 toward a distal edge 528. Additionally, a side wall portion 530 can, optionally, extend axially from along outer end wall portion 512 in a direction opposite inner side wall portion 526 to a distal edge 532 that faces opposite distal edge 528. An inner end wall portion 534 can extend radially inward from along inner side wall portion 526 and/or side wall portion 530 toward an inner peripheral edge 536 that together with inner surface portions 538 and/or 540 of side wall portions 526 and/or 530, respectively, can at least partially define a passage 542 through end member housing 504 that is dimensioned to receive and retain a seal cap 600A-D.

In some cases, an annular groove 544 and/or similar engagement feature can extend radially outward into side wall portion 530 and may be dimensioned to receive at least a portion of a retaining ring 546 or other similar component, for example. Additionally, an annular groove 548 can extend radially outward into side wall portion 530 in axially-spaced relation to annular groove 544, such as may be suitable for sealingly receiving a seal component 550 that can be dimensioned to form a substantially fluid-tight seal on, along or otherwise with seal cap 600A-D, for example. Housing wall 510 can also include one or more features, such as a shoulder surface 552, for example, dimensioned to axially support seal cap 600A-D on or along end member housing 504. As one example, shoulder surface 552 could be spaced axially from annular groove 544 such that seal cap 600A-D can be captured between shoulder surface 552 and retaining ring 546, for example. Additionally, outer peripheral wall portion 522 can include opposing surface portions 554 and 556. Outer end wall portion 512 can include an inner surface portion 558 and/or inner side wall portion 526 can include an outer surface portion 560. Inner surface portion 558 and/or outer surface portion 560 can at least partially define housing chamber 502.

End member housing 506 can include any suitable number of walls and/or wall portions. For example, end member housing 506 is shown in FIGS. 2-4 and 6 as including a housing wall 562 with an end wall portion 564 that is oriented transverse to longitudinal axis AX and extends radially outward toward an outer side wall portion 566. An inner surface portion 568 is disposed along outer side wall portion 566 and at least partially defines housing chamber 502. Outer side wall portion 566 extends axially from along end wall portion 564 to a distal end wall portion 570 that includes an outer peripheral edge 572 as well as opposing surface portions 574 and 576. A crimp wall portion 578 is disposed radially inward of outer side wall portion 566 and extends from along end wall portion 564 in a direction away from outer side wall portion 566. Crimp wall portion 578 can include one or more securement features 580 (e.g., annular grooves) disposed therealong and dimensioned to abuttingly engage and retain end 306 of flexible spring member 300. Housing wall 562 also includes an inner end wall portion 582 that extends between and operatively interconnects crimp wall portion 578 with an inner side wall portion 584 that extends axially in a direction away from the inner end wall portion toward a distal end 586. Inner side wall portion 584 can include a surface portion 588 facing radially inward and a surface portion 590 facing radially outward that can at least partially define housing chamber 502. Inner side wall portion 584 can be dimensioned to receivingly engage inner side wall portion 526 such that the wall portions are axially coextensive with inner surface portion 538 and surface portion 590 disposed in facing relation to one another. In some cases, an annular groove 592 or other similar feature can be disposed along inner side wall portion 584, such as may be suitable for sealingly receiving a sealing element 594, for example. In some cases, one or more other walls and/or wall portions of housing wall 562 can include one or more passage formed therethrough, such as may be suitable for permitting fluid transfer and/or other access/communication to, from and/or otherwise between spring chamber 302 and end member chamber 502. As a non-limiting example, inner end wall portion 582 can include one or more holes, openings or passages 596 formed or otherwise extending at least partially therethrough.

In an assembled condition, surface portion 554 of end member housing 504 and surface portion 574 of end member housing 506 are disposed in facing relation to one another. Crimp ring 508 can extend peripherally around outer peripheral wall portion 522 and distal end wall portion 570 to retain the end member housings in an assembled condition such that end member chamber 502 can, in some cases, be at least partially defined therebetween. Additionally, it will be recognized and appreciated that gas spring and damper assembly AS1 can include any suitable number of one or more other features, components, assemblies and/or systems. As a non-limiting example, a bushing BSG can be received within passage portion 542, such as along inner surface portion 540 and operatively engage one or more components of damper assembly DP1. In some cases, bushing BSG could have one or more component portions that are electrically operable or otherwise conductively coupled to one or more other systems or components, such as zero or more electromagnetic coils EMC, for example. As another non-limiting example, damper assembly DP1 could be of a type and/or kind that is electrically variable, receives and/or generates electrical sensor signals and/or is otherwise conductively coupled to one or more other systems and/or components. Such non-limiting examples of performance variable components, sensors and/or other systems and/or devices are collectively represented in FIG. 4 by boxes PVC as being communicatively coupled by way of conductors or leads DPC. As a further non-limiting example, gas spring and damper assembly AS1 can include zero or more sensors, zero or more communication devices and/or zero or more control devices that are electrically powered and/or otherwise conductively coupled with one or more other systems and/or components. Non-limiting examples of sensors and/or communication devices can include height or distance sensors, acceleration sensors, temperature sensors, pressure sensors and/or communication sensors such as may be suitable for communicating with another remotely located system or device, such as tire pressure sensors through a wireless communication protocol. All of such non-limiting and merely exemplary sensors and communication devices are collectively represented in FIG. 4 by box SDS as being conductively coupled by way of conductors or leads SDC. Additionally, or in the alternative, gas spring and damper assembly AS1 can include zero or more control devices, such as may be operable to permit and/or inhibit fluid communication into, out of and/or between gas spring assembly GS1 and/or any components or volumes associated therewith. All of such control devices are collectively represented in FIG. 4 by box GDS as being conductively coupled by way of conductors or leads GDC. Any one or more of such systems and/or components can be conductively coupled with conductors or leads EXC that are external to gas spring and damper assembly AS1, such as may be communicatively coupled with an associated system or device (e.g., ECU 126 of control system 124), such as by way of a suitable vehicle communication protocol. In some cases, conductors or leads DPC, SDC, GDC and/or EXC can include a connector CNN disposed therealong that is adapted to cooperatively engage seal cap 600A-D, such as is discussed hereinafter.

It will be appreciated that conductors or leads, DPC, SDC, and/or GDC can extend through gas spring and damper assembly AS1 and into engagement with seal cap 600A-D in any suitable manner. As a non-limiting example, conductors or leads DPC are shown in FIG. 4 as extending through a passage 234 disposed along at least a portion of elongated damper rod 216. As another non-limiting example, zero or more of the conductors or leads can extend through spring chamber 304 and/or end member chamber 502. In the exemplary arrangement shown in FIGS. 4, 5 and 7-10, housing wall 510 can include one or more passages or ports 598 extending through end member housing 504. Zero or more of conductors or leads DPC, SDC and/or GDC can extend through passages 598 and into area 542A of passage 542 for engagement with seal cap 600A-D.

Seal caps in accordance with the subject matter of the present disclosure are operative to provide a substantially fluid-tight seal across an open end of a passage through which one or more electrical conductors are desired to extend. Seal caps in accordance with the subject matter of the present disclosure include one or more conductive elements that are at least partially embedded in the seal cap such that electrical conductivity through the seal cap is available while also providing a substantially fluid-tight seal across the open end of the passage. In this manner, electrical signals can be communicated from a side of the seal cap exposed to a first gas pressure level (e.g., spring pressure) to the opposing side of the seal cap which may be exposed to a second gas pressure level (e.g., atmospheric pressure) that is different from the first gas pressure level. In this manner, systems and/or devices within or on one portion of the gas spring and damper assembly can be communicatively coupled with systems and/or devices outside of or on another portion of the gas spring and damper assembly.

It will be appreciated that seal cap constructions of a variety of types and kinds can be used, such as are shown as non-limiting examples in FIGS. 4 and 7-10. For example, seal caps 600A-D are shown in FIGS. 4 and 7-10 as being secured along end member housing 504 of end member assembly 500, such as, for example, by as being supported between shoulder surface 552 and retaining ring 546 thereby separating passage 542 into a first area 542A that is exposed to a first gas pressure level (e.g., spring pressure) and a second area 542B that is exposed to a second pressure level (e.g., atmospheric pressure). Seal caps 600A-D can also form a substantially fluid-tight seal across passage 542 in a suitable manner, such as by sealingly engaging sealing component 550, for example.

In the exemplary arrangements shown, seal caps 600A-D include a seal cap body or wall 602 with a wall portion 604 that extends radially outward toward an outer peripheral surface portion or edge 606. Seal cap wall 602 can also include a wall portion 608 disposed radially inward of wall portion 604. In some cases, the wall portions can be disposed in an approximately common plane with one another. In other cases, however, wall portions 604 and 608 can be disposed in axially-spaced relation to one another with a wall portion 610 extending therebetween and operatively connecting wall portions 604 and 608. It will be appreciated that wall portion 610 can be of any suitable shape or configuration, such as a having a an approximately linear or curvilinear cross-sectional profile or shape. In the arrangement shown in FIGS. 4 and 7-10, wall portion 610 is disposed at a non-zero angle relative to wall portions 604 and 608, which are approximately planar. And, seal caps 600A-D are oriented relative to end member housing 504 such that the offset of wall portion 608 increases the size of area 542A in comparison with being oriented with wall portion 608 being disposed toward end member housing 506. Seal cap wall 602 of seal caps 600AD also includes opposing surfaces 612 and 614 with surface 612 generally exposed to the first gas pressure level (e.g., spring pressure) and surface 614 exposed to the second gas pressure level (e.g., atmospheric pressure).

Seal caps in accordance with the subject matter of the present disclosure include one or more conductive elements at least partially embedded therein such that a substantially fluid-tight seal is formed between the one or more conductive elements and the seal cap wall. In a preferred arrangement, at least a portion of the one or more conductive elements will include a substantially air-impermeable portion that will substantially inhibit the transfer of pressurized gas through the conductive elements. As a non-limiting example, the one or more conductive elements can include at least a section of solid, non-stranded wire that is embedded within the seal cap wall. In some cases, substantially all of the conductive element can be formed from solid, non-stranded wire. In this manner, exposed conductive ends of the one or more conductive elements can conductively communicate across the seal cap wall while substantially inhibiting pressurized gas flow across the seal cap wall.

Figure 7:
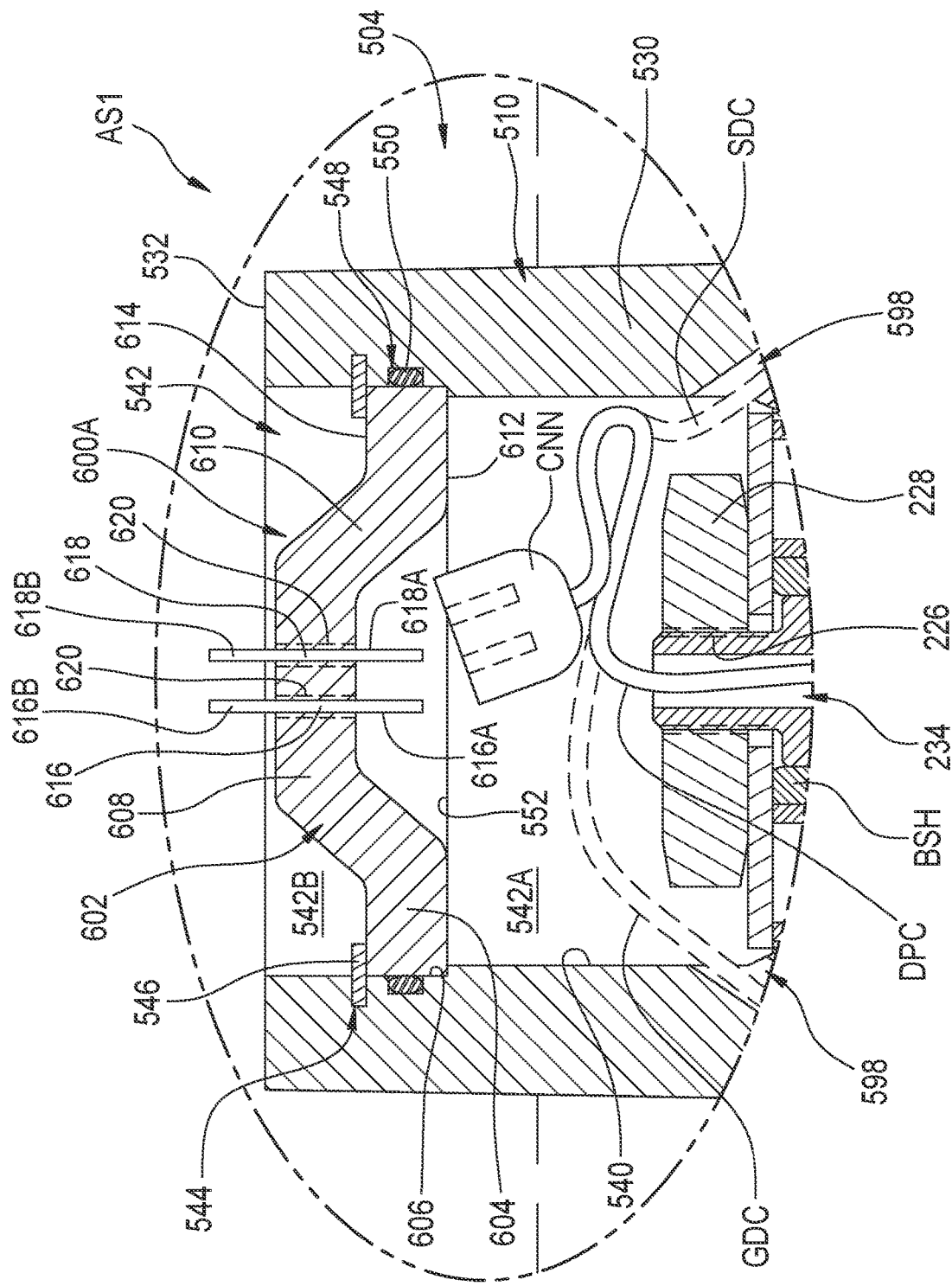
FIG. 7 is an enlarged view of a portion of the gas spring and damper assembly in FIGS. 2-4 identified as Detail 7 in FIG. 4 showing one example of a seal cap in accordance with the subject matter of the present disclosure.

In the arrangement shown in FIGS. 4 and 7, for example, a seal cap 600A includes electrical conductors 616 and 618 that are at least partially embedded within seal cap wall 602, such that a substantially fluid-tight connection is formed therewith as is represented in FIGS. 4-7 by dashed lines 620. It will be appreciated that electrical conductors 616 and 618 can be of any suitable size, shape, and/or configuration and can be formed from any suitable electrically conductive material or combination of electrically conductive and non-electrically conductive materials. Additionally, in a preferred arrangement, seal cap wall 602 can be at least partially formed from a substantially nonelectrically conductive material. In which case, electrical conductors 616 and 618 can be directly embedded within the seal cap without permitting conductive cross-communication between the two or more electrical conductors. In the arrangement shown in FIGS. 4 and 7, electrical conductors 616 and 618 are approximately linear and are disposed in offset alignment with one another (e.g., substantially parallel) with conductor portions 616A and 618A exposed within area 542A for communicative coupling with connector CNN and one or more of conductors DPC, SDC and/or GDC while conductor portions 616B and 618B are exposed within area 542B for communicative coupling with connector CNN of conductor EXC.

Figure 8:
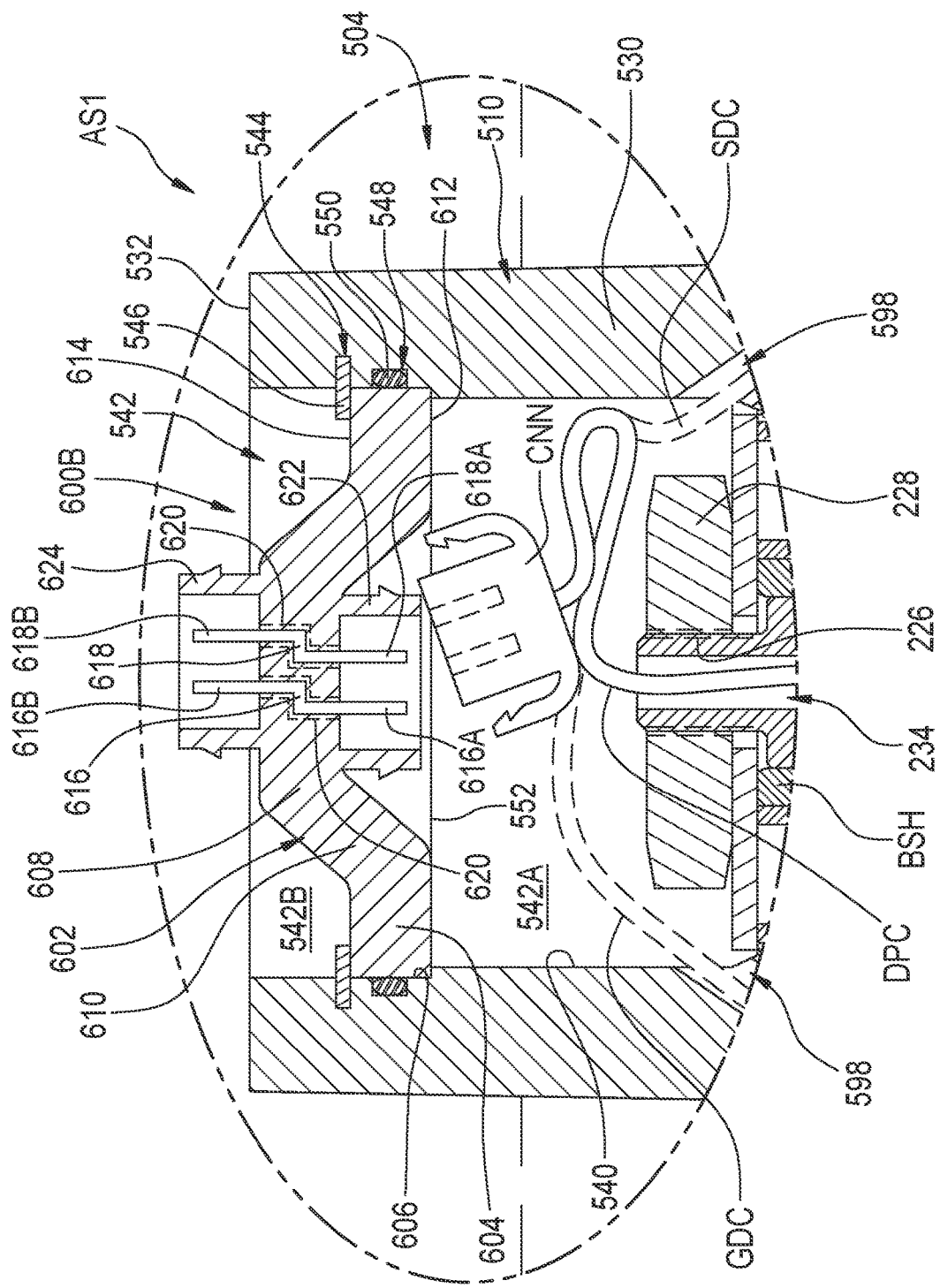
FIG. 8 is the enlarged view of the portion of the gas spring and damper assembly in FIG. 7 showing another example of a seal cap in accordance with the subject matter of the present disclosure.

Another exemplary construction of a seal cap 600B is shown in FIG. 8 and includes seal cap wall 602 that includes wall portions 604, 606 and 608, as described above. Seal cap 600B also includes electrical conductors 616 and 618, which differ from the electrical conductors shown and described in connection with FIGS. 4 and 7 in that at least a portion of the electrical conductors in FIG. 8 extend laterally (i.e., transverse to longitudinal axis AX) Additionally seal cap wall 602 in FIG. 8 includes an outer side wall portion 622 extending axially from along surface 612 and an outer side wall portion 624 extending axially from along surface 614. In some cases, the outer side wall portions can include one or more retention features (e.g., barbs) and connectors CNN can include corresponding retention features to cooperatively engage the retention features on or along outer side wall portions 622 and/or 624.

Figure 9:
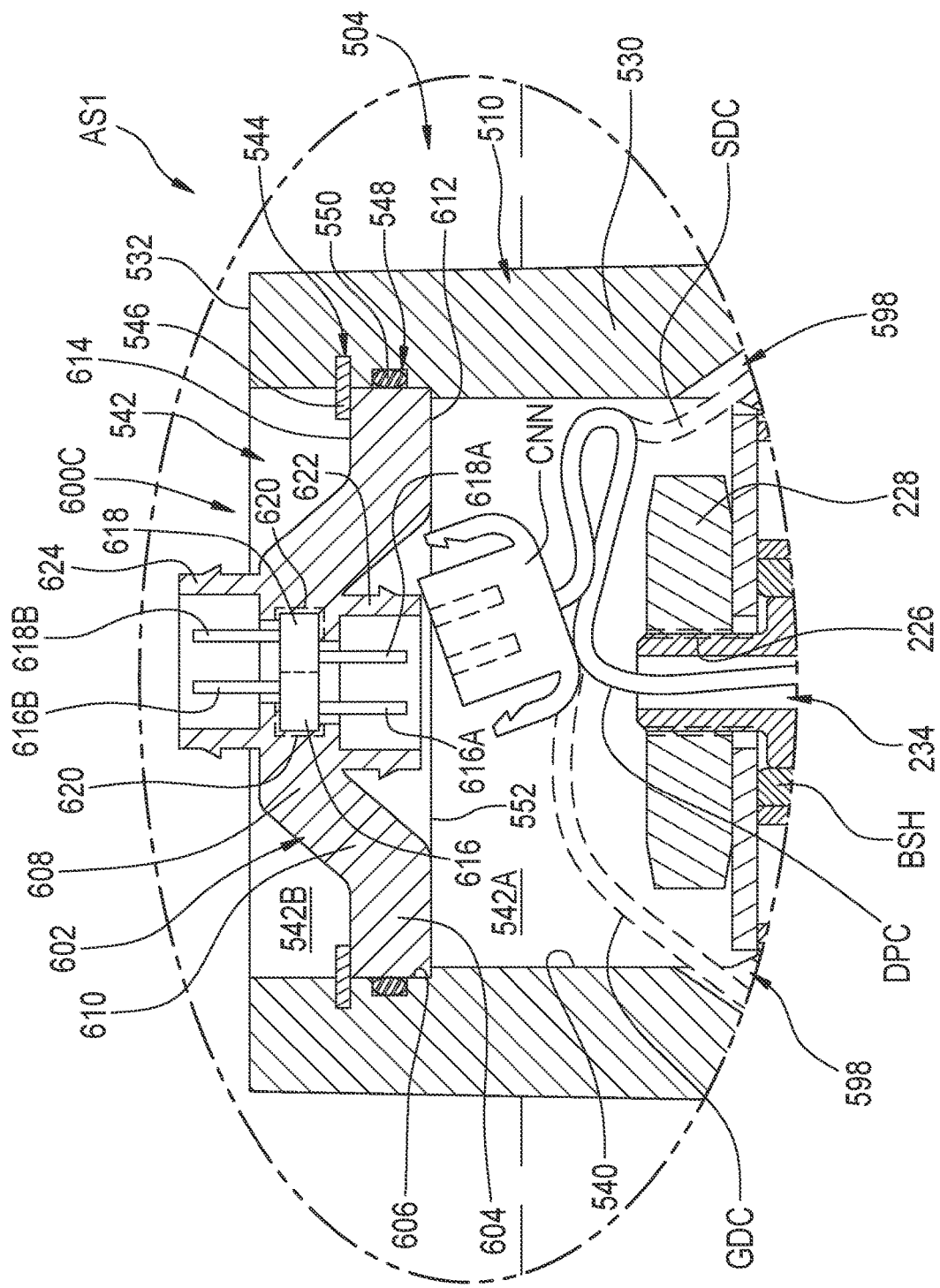
FIG. 9 is the enlarged view of the portion of the gas spring and damper assembly in FIG. 7 showing yet another example of a seal cap in accordance with the subject matter of the present disclosure.

Yet another exemplary construction of a seal cap 600C is shown in FIG. 9 and includes seal cap wall 602 that includes wall portions 604, 606 and 608, as described above. Seal cap 600C also includes electrical conductors 616 and 618, which differ from the electrical conductors shown and described in connection with FIGS. 4, 7 and 8 in that electrical conductors 616 and 618 are shown as being sections of an electrical fitting with separate conductive portions (i.e., conductors 616 and 618). Additionally, a portion of the electrical connector fitting is exposed along both of surfaces 612 and 614 while retaining a substantially fluid-tight connection across the seal cap as indicated by dashed lines 620.

Figure 10:
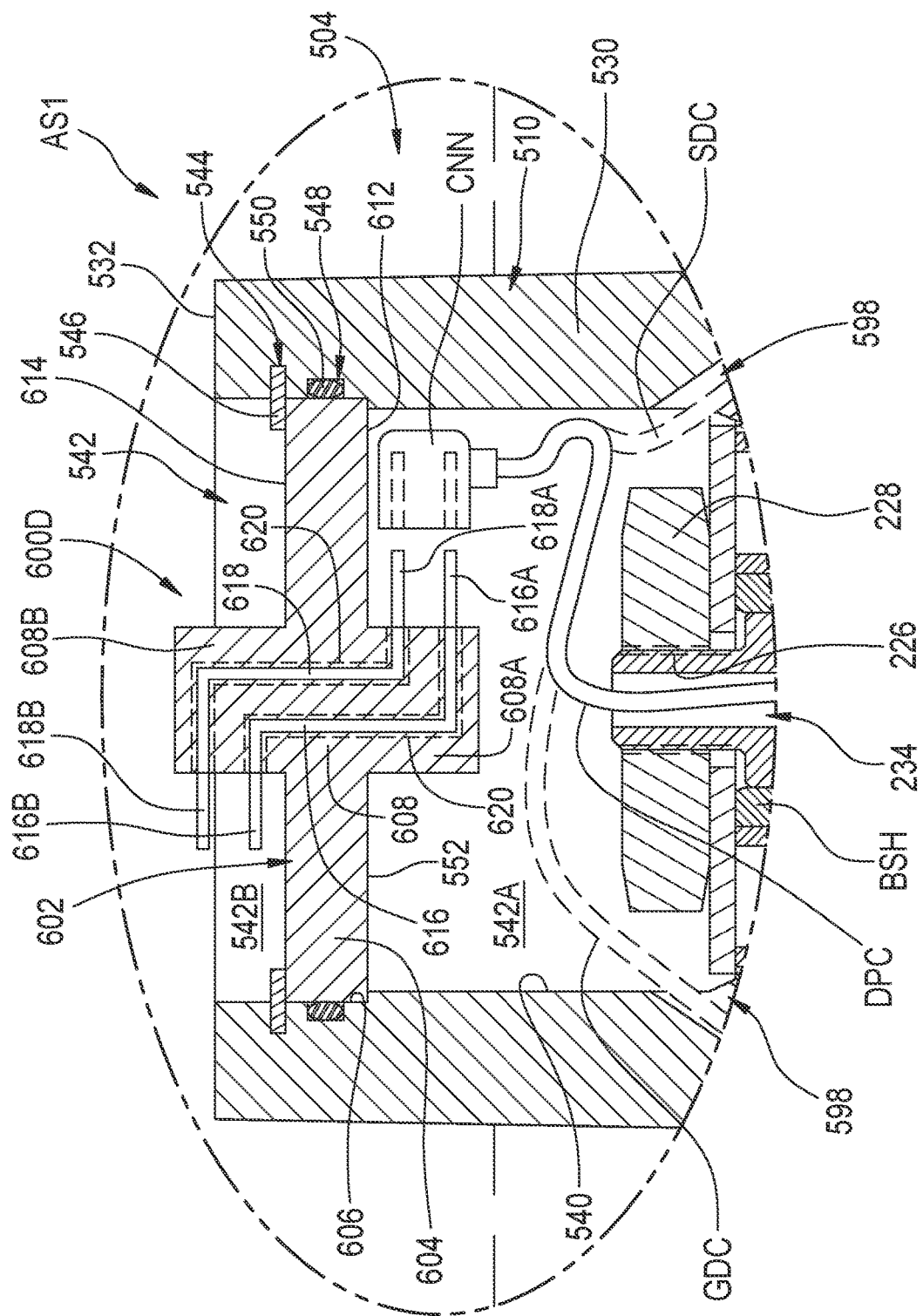
FIG. 10 is the enlarged view of the portion of the gas spring and damper assembly in FIG. 7 showing still another example of a seal cap in accordance with the subject matter of the present disclosure.

A further exemplary construction of a seal cap 600D is shown in FIG. 10 and includes a seal cap wall 602 with a wall portion 604 that extends radially outward toward an outer peripheral edge 606. Seal cap wall 602 can also include a wall portion 608 disposed radially inward of wall portion 604. Seal cap 600D differs from seal caps 600A-C in that wall portions 604 and 608 are disposed in an approximately common plane with one another. Wall portion 608 extends axially outward beyond wall portion 604 toward wall portion end surfaces 608A and 608B. Electrical conductors 616 and 618 extend axially through wall portion 608 and include conductor portions 616A and 618A disposed along surface 612 that extend in a first lateral direction (e.g., in a direction transverse to axis AX) as well as conductor portions 616B and 618B disposed along surface 614 that extend in a second lateral direction (e.g., a direction transverse to axis AX) that is opposite the first lateral direction.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring seal cap dimensioned for securement to an associated end member, said gas spring seal cap comprising:
   a seal cap body having a longitudinal axis and extending radially outward from along said longitudinal axis, said seal cap body including:
      a first end surface portion disposed along a first side of said gas spring seal cap;
      a second end surface portion disposed along a second side of said gas spring seal cap that is spaced longitudinally from said first side and facing opposite said first end surface portion; and,
      an outer peripheral surface portion disposed between said first and second end surface portions; and,
   a first electrical conductor and a second electrical conductor extending through said seal cap body, each of said first and second electrical conductors disposed radially inward from said outer peripheral surface portion and including:
      a first terminal end conductively accessible from along said first end surface portion of said seal cap body; and,
      a second terminal end conductively accessible from along said second end surface portion of said seal cap body;
      said first and second terminal ends adapted for conductive coupling with an associated electrical connector; and, each of said first and second electrical conductors including a substantially impermeable portion having a substantially fluid-tight connection with said seal cap body with said substantially impermeable portion of at least one of said first and second electrical conductors including a section of solid, non-stranded wire and with said substantially impermeable portion of each of said first and second electrical conductors substantially inhibiting fluid communication across said seal cap body through a respective one of said first and second electrical conductors.

2. A gas spring seal cap according to claim 1, wherein said first and second electrical conductors are integrally molded in said seal cap body.

3. A gas spring seal cap according to claim 1, wherein said seal cap body is made of substantially non-conductive material.

4. A gas spring seal cap according to claim 1, wherein said seal cap body includes a first side wall portion extending longitudinally outward from along said first end surface portion and at least partially forming a first perimeter around said first terminal end of said first and second electrical conductors.

5. A gas spring seal cap according to claim 4, wherein said seal cap body includes a second side wall portion extending longitudinally from along said second end surface portion and at least partially forming a second perimeter around said second terminal end of said first and second electrical conductors.

6. A gas spring seal cap according to claim 1, wherein said substantially impermeable portion of at least one of said first and second electrical conductors includes an electrical connector fitting embedded within said seal cap body inward of said first end surface portion and said second end surface portion with said first terminal and second terminal ends of at least one of said first and second electrical conductors extending outwardly beyond said first end surface portion and said second end surface portion from along said electrical connector fitting of a respective one of said at least one of said first and second electrical conductors.

7. A gas spring seal cap according to claim 1, wherein at least one of said first and second terminal ends of at least one of said first and second electrical conductors extends outwardly from said seal cap body in an axial direction.

8. A gas spring seal cap according to claim 1, wherein at least one of said first and second terminal ends of at least one of said first and second electrical conductors extends outwardly from said seal cap body in a direction transverse to said longitudinal axis.

9. A gas spring and damper assembly comprising:
a damper having a longitudinal axis and including a damper housing and a damper rod operatively connected with said damper housing for relative reciprocal motion therebetween; and,
a gas spring including:
a first end member supported on said damper rod;
a second end member longitudinally spaced from said first end member and extending longitudinally along at least a portion of said damper housing; and,
a flexible spring member extending peripherally about said longitudinal axis between opposing first and second ends, said first end secured on said first end member such that a substantially fluid-tight seal is formed therebetween and said second end secured on said second end member such that a substantially fluid-tight seal is formed therebetween, said flexible spring member and said first and second end members at least partially defining a spring chamber;
an internal conductor at least partially disposed within at least one of said gas spring chamber, said damper housing and said damper rod; and,
a seal cap secured to said first end member such that a substantially fluid-tight connection is formed therebetween, said seal cap including:
a seal cap body extending radially outward from along said longitudinal axis, said seal cap body including:
a first end surface portion disposed along a first side of said seal cap;
a second end surface portion disposed along a second side of said seal cap that is spaced longitudinally from said first side and faces opposite said first end surface portion;
an outer peripheral surface portion disposed between said first and second end surface portions; and,
an electrical conductor extending through said seal cap body, said electrical conductor disposed radially inward from said outer peripheral surface and including:
a first terminal end conductively accessible from along said first end surface portion on said first side of said seal cap body; and,
a second terminal end conductively accessible from along said second end surface portion on said second side of said seal cap body and conductively connected to said internal conductor;
said electrical conductor including a substantially impermeable portion having a substantially fluid-tight connection with said seal cap body with said substantially impermeable portion of said electrical conductor including a section of solid, non-stranded wire and substantially inhibiting fluid communication across said seal cap body through said electrical conductor.

10. A gas spring and damper assembly according to claim 9, wherein said internal conductor includes a plurality of conductive leads, said electrical conductor is a first electrical conductor conductively coupled with one of said plurality of conductive leads of said internal conductor, and said gas spring and damper assembly further comprises a second electrical conductor extending through said seal cap body, said second electrical conductor including:
a first terminal end conductively accessible from along said first end surface portion of said seal cap body; and,
a second terminal end conductively accessible from along said second end surface portion of said seal cap body and conductively connected to a different one of said plurality of conductive leads of said internal conductor;
said second electrical conductor including a substantially impermeable portion having a substantially fluid-tight connection with said seal cap body with said substantially impermeable portion of said second electrical conductor including a section of solid, non-stranded wire and substantially inhibiting fluid communication across said seal cap body through said second electrical conductor.

11. A gas spring and damper assembly according to claim 9, wherein said gas spring and damper assembly further comprises a damper rod bushing operatively connected between said first end member and said damper rod with said damper rod bushing including an electrically conductive coil at least partially embedded therein, said electrically conductive coil being conductively coupled with said internal conductor such that said electrically conductive coil is conductively coupled through said seal cap to said first terminal end of said electrical conductor.

12. A gas spring and damper assembly according to claim 9, wherein said seal cap body includes:
   a first side wall portion extending longitudinally outward from along said first end surface portion and at least partially forming a first perimeter around said first terminal end of said electrical conductor; and,
   a second side wall portion extending longitudinally from along said second end surface portion and at least partially forming a second perimeter around said second terminal end of said electrical conductor with said second side wall portion dimensioned to operatively engage a connector fitting of said internal conductor.

13. A gas spring and damper assembly according to claim 9, wherein said electrical conductor is integrally molded into said seal cap body.

14. A gas spring and damper assembly according to claim 9, wherein said seal cap body is made of substantially non-conductive material.

15. A gas spring and damper assembly according to claim 9, wherein said substantially impermeable portion of said electrical conductor includes an electrical connector fitting embedded within said seal cap body inward of said first end surface portion and said second end surface portion with said first and second terminal ends respectively extending outward beyond said first and second end surface portions from said electrical connector fitting.

16. A gas spring and damper assembly according to claim 9, wherein at least one of said first and second terminal ends of said electrical conductor extends outwardly from said seal cap body in an axial direction.

17. A gas spring and damper assembly according to claim 9, wherein seal cap is supported on said first end member with said substantially fluid tight seal therebetween with said first terminal end of said electrical conductor externally accessible and with said internal conductor conductively coupled with said first terminal end of said electrical conductor through said seal cap body.

18. A method of assembling a gas spring and damper assembly comprising:
   securing a flexible spring member to a first end member to at least partially define a spring chamber;
   providing a damper including a damper housing and a damper rod operatively connected to one another such that said damper rod and said damper housing can undergo relative reciprocal motion;
   securing said first end member to said damper rod of said damper such that said damper rod extends through said spring chamber;
   extending an internal conductor through at least a portion of at least one of said gas spring chamber, said damper housing and said damper rod;
   providing a gas spring seal cap including:
      a seal cap body having a longitudinal axis and extending radially outward from along said longitudinal axis, said seal cap body including:
         a first end surface portion disposed along a first side of said gas spring seal cap;
         a second end surface portion disposed along a second side of said gas spring seal cap that is spaced longitudinally from said first side and facing opposite said first end surface portion; and,
         an outer peripheral surface portion disposed between said first and second end surface portions; and,
      a first electrical conductor and a second electrical conductor extending through said seal cap body, each of said first and second electrical conductors disposed radially inward from said outer peripheral surface portion and including:
         a first terminal end conductively accessible from along said first end surface portion on said first side of said seal cap body; and,
         a second terminal end conductively accessible from along said second end surface portion on said second side of said seal cap body;
      each of said first and second electrical conductors including a substantially impermeable portion having a substantially fluid-tight connection with said seal cap body with said substantially impermeable portion of each of said first and second electrical conductors substantially inhibiting fluid communication across said seal cap body through a respective one of said first and second electrical conductors;
   conductively coupling said internal conductor to said second terminal end of at least one of said first and second electrical conductors along said second side of said cap body; and,
   securing said gas spring seal cap on said first end member such that a substantially fluid tight seal is formed between said gas spring seal cap and said first end member such that said first terminal ends of said first and second electrical conductors are externally accessible with said internal conductor conductively coupled with said first terminal end of said at least one of said first and second electrical conductors.

19. A method of assembling a gas spring and damper assembly according to claim 18 further comprising:
   providing a damper rod bushing including an electrically conductive coil at least partially embedded therein;
   securing said damper rod bushing to said damper rod and said first end member; and,
   conductively connecting said an internal conductor to said electrically conductive coil of said damper rod bushing such that said electrically conductive coil is conductively coupled with said first terminal end of said at least one of said first and second electrical conductors.

20. A method according to claim 18, wherein said providing said gas spring seal cap includes providing at least one of said first electrical conductor and said second electrical conductor with a section of solid, non-stranded wire substantially inhibiting fluid communication across said seal cap body through said at least one of said first and second electrical conductors.

* * * * *